United States Patent [19]
Nolan et al.

[11] Patent Number: 5,936,828
[45] Date of Patent: Aug. 10, 1999

[54] 110 VOLT TO 200 VOLT ADAPTOR

[75] Inventors: James P. Nolan, Maywood; George Gerhardt Funk, Long Beach, both of Calif.

[73] Assignee: James P. Nolan, Maywood, Calif.

[21] Appl. No.: 09/047,172

[22] Filed: Mar. 24, 1998

[51] Int. Cl.⁶ .................................................. H01H 47/00
[52] U.S. Cl. .......................... 361/167; 361/189; 307/71
[58] Field of Search .......................... 361/77, 160, 167, 361/166, 185, 187, 189, 206, 210, 245; 307/113, 127, 71, 87; 439/172, 490, 654, 924.1

[56] References Cited

U.S. PATENT DOCUMENTS

| | | | |
|---|---|---|---|
| 2,138,275 | 11/1938 | Heinrich | 175/375 |
| 2,372,435 | 3/1945 | La Forest | 177/353 |
| 3,833,821 | 9/1974 | Weaver | 307/150 |
| 3,938,068 | 2/1976 | Hagan | 337/189 |
| 3,991,320 | 11/1976 | Boss | 307/147 |
| 4,053,788 | 10/1977 | Robie | 307/11 |
| 4,131,805 | 12/1978 | Austin et al. | 307/147 |
| 4,724,505 | 2/1988 | Gelbort | 361/167 |
| 5,160,852 | 11/1992 | Charles et al. | 307/77 |
| 5,245,219 | 9/1993 | Romatzick, Jr. et al. | 307/71 |
| 5,260,864 | 11/1993 | Simonelli et al. | 363/143 |
| 5,672,066 | 9/1997 | Yeung | 439/107 |

*Primary Examiner*—Jeffrey Gaffin
*Assistant Examiner*—Kim Huynh
*Attorney, Agent, or Firm*—John L. Rogitz

[57] ABSTRACT

A voltage adaptor outputs 208–220 volts at an outlet and receives two 110 volt inputs. The adaptor has first and second male input connectors that can mate with respective power connectors and a control circuit interconnecting the male connectors to the outlet of the adaptor. The control circuit prevents energizing the outlet unless both male connectors are mated with respective energized power connectors and the phases of the voltages carried by the power connectors are different from each other. Furthermore, the control circuit prevents the energization of one of the male connectors, when it is not mated with a power connector, from the other male connector when the other connector happens to be mated with an energized power connector, thereby preventing a shock hazard that could otherwise arise when one of the male connectors is plugged in but the other male connector remains exposed to the touch.

15 Claims, 4 Drawing Sheets

110 VOLT TO 200 VOLT ADAPTOR

FIELD OF THE INVENTION

The present invention relates generally to doubling the power to electrical devices in buildings with 110 volt convenience outlets but not 220 volt outlets. More particularly, the present invention relates to devices for safely combining the outputs of two 110 volt receptacles to output 208–220 volts, thereby doubling the power delivered because the available amperage is not reduced, in contrast to transformers.

BACKGROUND

Many common electrical devices use 110 volt, 15 ampere current (or more) electrical power, which can exceed the capacities of standard 15 ampere circuits and convenience outlets. Many of these devices can also use 220 volt power, which permits halving the delivered amperage while maintaining the same power as a 110 volt supply with double the amperage. Further, other devices use only 220 volt power. Representative of devices that can use or must use 220 volt power are, e.g., floor sanders, cappucino machines, and electric vehicle recharging systems.

Most commercial power outlets, however, supply 110 volt power. One way to convert 110 volt power to 220 volt power is to use a transformer, but use of a transformer, while doubling the voltage, halves the current. Thus, no power gain is realized.

Another way to supply 220 volt power is to provide a 220 volt generator. Unfortunately, such generators require the use of a prime mover such as an engine that might emit noxious fumes and undesirable noise. Also, generators are relatively bulky and expensive. These drawbacks render generators unacceptable for many applications.

As recognized by the present invention, a third way to supply 220 volt power is to use a non-transformer adaptor to convert two 110 volt inputs into a single 220 volt output. As recognized herein, such an adaptor would require two extension cords from two separate 110 volt wall sockets to be plugged into respective male connectors of the adaptor. The voltage can then be summed by the adaptor to supply 220 volt power without halving the current.

As still further recognized herein, however, the use of two male connectors can potentially present a risk of shock. More particularly, if one male connector of an adaptor is plugged into an energized extension cord, and the other male connector of the adaptor remains exposed even if only for a short while, e.g., while a person seeks another wall outlet or extension cord for the exposed male connector, the exposed male connector prongs, without the benefit of the principles set forth herein, would be energized and, thus, would represent a shock hazard.

Additionally, the present invention understands that extension cords and/or the commercial power circuits to which the cords are connected might be incorrectly wired, i.e., have reverse polarity, and that such reverse polarity, when detected, ideally should be corrected prior to power conversion.

Fortunately, the present invention recognizes that it is possible to provide a control circuit for a 220V adaptor that ensures that an exposed male connector of the adaptor is safe, even when the other male connector of the adaptor is energized. Also, the present invention recognizes that it is possible to account for an input power source having reverse polarity.

Accordingly, it is an object of the present invention to provide a 110 volt to 220 volt (110V–220V) adaptor that ensures that exposed male connectors of the adaptor do not present a shock hazard. Another object of the present invention is to provide a 110V–220V adaptor that is easy to use and cost-effective to manufacture. Still another object of the present invention is to provide a method and device for rapidly and easily accounting for reverse polarity in an input power supply to a 220V adaptor.

SUMMARY OF THE INVENTION

A voltage adaptor is disclosed for outputting electrical power having a voltage of at least 208 volts from two inputs each having voltages of 110 volts. The adaptor includes a housing holding at least one control circuit including at least one outlet receptacle. First and second male electrical connectors are electrically connected to the control circuit.

In accordance with the present invention, the control circuit includes a main contactor including a main control coil energizable to close at least first and second main contacts to energize the outlet receptacle with electricity from the inputs. The first main contact is in a circuit path from the first male electrical connector to the outlet receptacle, whereas the second main contact is in a circuit path from the second male electrical connector to the outlet receptacle.

The control circuit also includes a first control contactor including a first control coil energizable to close a first control contact. Per present principles, the first control contact is in a circuit path between the main control coil and the first male electrical connector, and the first control coil is energizable only when the second male electrical connector is connected to an energized power source connector. Similarly, a second control contactor includes a second control coil energizable to close a second control contact, with the second control contact being in a circuit path between the main control coil and the second male electrical connector. The second control coil is energizable, however, only when the first male electrical connector is connected to an energized power source connector.

The main contactor can be closed only when both control contacts are closed.

Consequently, when the first male electrical connector is engaged with an energized power source connector and the second male electrical connector is not engaged with a power source connector, no voltage differential from ground exists on the second male electrical connector. Under these circumstances, the second male electrical connector is safe.

In a preferred embodiment, the first male electrical connector includes a ground lead, a first neutral lead, and a first power lead, and the second male electrical connector includes a ground lead, a second neutral lead, and a second power lead. The first neutral lead and first power lead are connected to the second control coil, while the second neutral lead and second power lead are connected to the first control coil.

Preferably, an indicator lamp is located on the housing to indicate the availability of two hundred volt or more power at the outlet receptacle when the main contactor is closed. Also, a manual switch is mounted on the housing and is operable to open and close power contacts in the circuit to the outlet receptacle.

In one embodiment, the housing is formed with first and second recesses for respectively holding the first and second male electrical connectors therein. In another embodiment, the male electrical connectors are distanced from the housing and are connected thereto by an input cord, with the input cord including a "Y" junction between the male electrical connectors and the housing.

Additionally, the adaptor is disclosed is combination with at least one pigtail including a neutral socket and a power socket, a neutral prong and a power prong, and a cord between the sockets and the prongs. Per the present invention, the neutral prong is electrically connected to the power socket and the power prong is electrically connected to the neutral socket. With this structure, the pigtail can be connected to a power source having its polarity improperly reversed to thereby provide power and neutral outputs having proper polarity. A test device can be provided for engaging an energized connector to determine whether the connector has been energized with power having correct polarity.

In another aspect, a voltage adaptor for outputting, at an outlet, electrical power characterized by at least 208 volts includes first and second electrical input connectors (for mating with respective power connectors. A control circuit interconnects the input connectors to the outlet. As disclosed in detail below, the control circuit prevents energization of the outlet unless both input connectors are mated with respective energized power connectors. The control circuit further prevents energization of the first input connector when the first input connector is not mated with a power connector and the second input connector is mated with an energized power connector.

In still another aspect, an electrical pigtail includes a cord defining a neutral socket and a power socket, and a plug defining a neutral prong and a power prong. The neutral prong is electrically connected to the power socket and the power prong is electrically connected to the neutral socket, whereby the pigtail can be connected to a power source having its polarity improperly reversed to thereby provide power having proper polarity.

In yet another aspect, a method for connecting an electrical device to an electrical power source includes the steps of providing a test device and an electrical pigtail having a reverse electrical polarity. The method also includes determining, by means of the test device, whether the electrical power source has reverse polarity. Then, the method envisions connecting the electrical device directly to the electrical power source when the test result is negative, and otherwise using the pigtail to interconnect the electrical device and the electrical power source.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
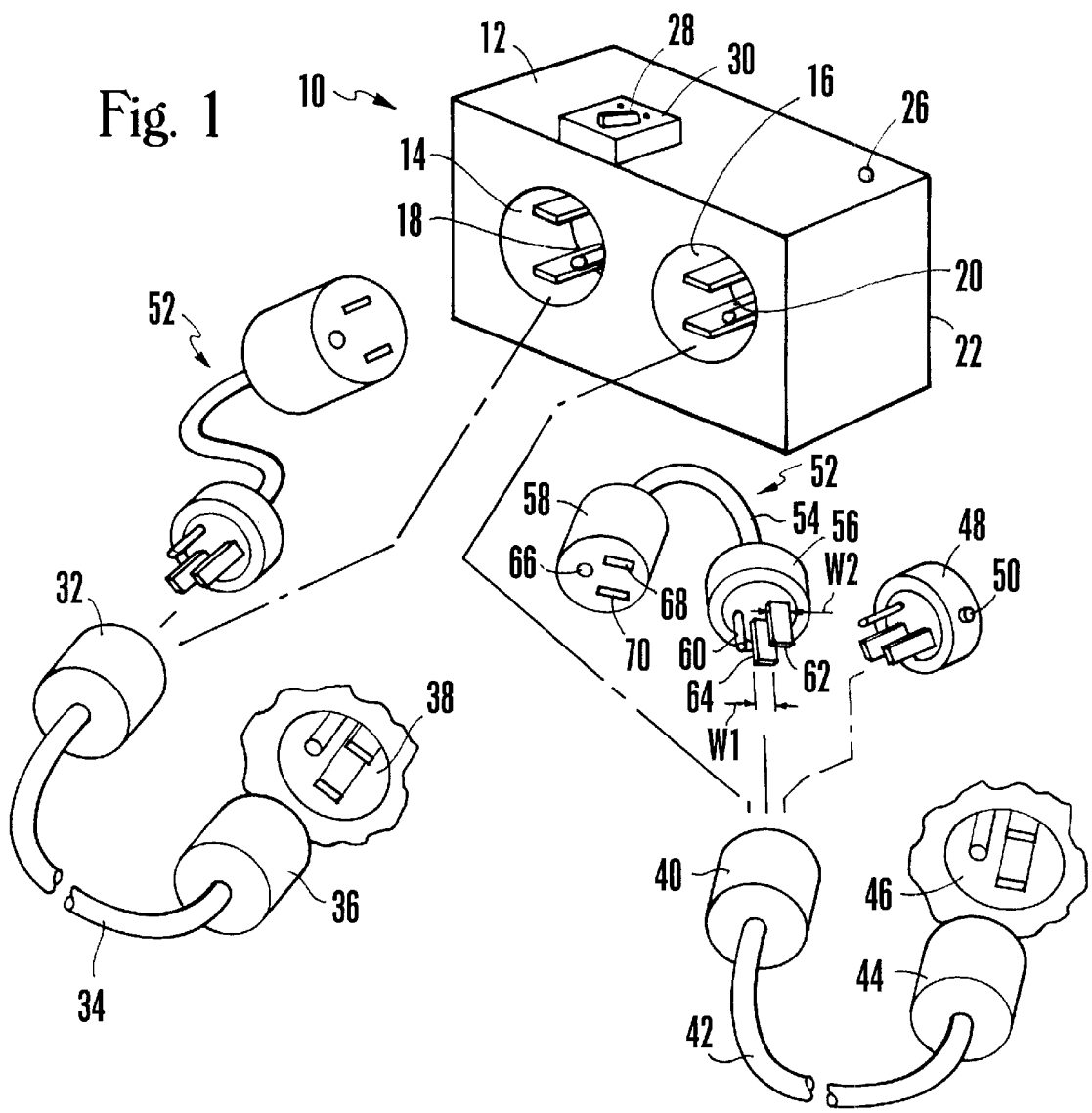
FIG. 1 is a perspective view of the voltage adaptor of the present invention, in an exploded relationship with input power cords, a polarity test device, and two reverse-wired pigtails, with portions broken away for clarity.

Referring initially to FIG. 1, a voltage adaptor is shown, generally designated 10. The voltage adaptor 10 is a non-transformer device that accepts two one hundred ten volt (110V) inputs and outputs two hundred eight volts to two hundred twenty volts (208V–220V). As the skilled artisan will recognize, the exact output voltage depends on the exact input voltage and the phase configuration (i.e., "Wye" or "Delta") of the input power source.

As shown in FIG. 1, the adaptor 10 includes a hollow lightweight metal or plastic housing 12 formed with first and second input recesses 14, 16. The housing 12 holds a control circuit as more fully disclosed below in reference to FIG. 3. A respective male electrical connector 18, 20 is positioned in each input recess 14, 16, and each male connector 18, 20 is electrically connected to the present control circuit within the housing 12. Thus, each male electrical connector 18, 20 is an input connector. Also, in brief cross-reference to FIGS. 1 and 2, the housing 12 defines an output side 22, and a 220V outlet receptacle 24 is mounted on the output side 22 and is electrically connected to the control circuit in the housing 12.

Additionally, an indicator lamp 26 is mounted on the housing 12. The indicator lamp 26 is energized by the control circuit to indicate the availability of 208V–220V power at the outlet receptacle 24, as more fully disclosed below. Furthermore, a manual two-pole switch 28 is mounted on a switch case 30 on the housing 12, and the manual switch 28 can be placed in an "OFF" position, wherein the outlet receptacle 24 is not energized, and an "ON" position, wherein the outlet receptacle 24 can be energized by the control circuit within the housing 12, provided the criteria discussed below are met.

As can be appreciated in reference to FIG. 1, the first male electrical connector 18 can be engaged with a power source connector such as a conventional female receptacle 32 of a first conventional extension cord 34. A first conventional male plug 36 of the first extension cord 34 can be plugged into a first conventional 110V electrical outlet 38. Likewise, the second male electrical connector 20 can engaged with a power source connector such as a conventional female receptacle 40 of a second conventional extension cord 42. A second conventional male plug 44 of the second extension cord 42 can be plugged into a second conventional 110V electrical outlet 46. As the present invention understands, the power supplied by the first outlet 38 must have an electrical phase that is different from the electrical phase of the power supplied by the second outlet 46. In most if not all buildings, the above condition can be satisfied because some building electrical outlets are wired to a first phase and some outlets are wired to a second phase.

Additionally, the present invention recognizes that one or both of the input power sources can have reverse polarity, i.e., one or more of the extension cords 34, 42 and outlets 38, 46 can have its neutral line and its power line reversed from their proper physical locations. The present invention further recognizes the desirability of detecting such reverse polarity and correcting it.

Accordingly, a conventional test device 48 is provided for engaging the female receptacles 32, 40 of the extension cords 34, 42 when the male plugs 36, 44 of the extension cords 34, 42 are engaged with their respective outlets 38, 46. The test device 48 is configured as a standard male three-prong plug, and when engaged with a power source, the test device indicates (e.g., by illuminating an indicator lamp 50 on the device 48) whether the power source is wired correctly. Stated differently, the test device 48 generates a signal representative of whether an energized power source (such as an electrical outlet with associated extension cord) has proper polarity.

When the test device 48 indicates that the power from an extension cord 34, 42 has proper polarity, the extension cord 34, 42 is engaged with the adaptor 10 as discussed above. On the other hand, when the test device 48 indicates that the power from an extension cord 34, 42 has reverse polarity, a reverse polarity pigtail, generally designated 52 (two pigtails 52 shown) is used to interconnect the affected extension cord with the adaptor 10.

More specifically, FIG. 1 shows that the pigtail 52 of the present invention includes a cord 54 interconnecting a male pigtail plug 56 and a female pigtail connector 58. The male pigtail plug 56 defines, in a clockwise direction looking down on FIG. 1, a solid cylindrical ground prong 60, a parallelepiped-shaped neutral prong 62, and a parallelepiped-shaped power prong 64. One of the neutral and power prongs 62, 64 can be smaller than the other, e.g., the power prong 64 can have a width W1 that is less than the width W2 of the neutral prong 62.

On the other hand, the female pigtail connector 58 defines, in a clockwise direction looking down on FIG. 1, a cylindrical ground socket 66, a parallelepiped-shaped power socket 68, and a parallelepiped-shaped neutral socket 70.

In accordance with the present invention, the neutral prong 62 is electrically connected to the power socket 68 and the power prong 64 is electrically connected to the neutral socket 70. With this structure, the male pigtail plug 56 can be connected to a power source such as an energized extension cord 42 that has its polarity improperly reversed, and then the female pigtail connector 58 connected to the male electrical connector 20 of the adaptor 10 to thereby provide to the male electrical connector 20 power and neutral inputs having proper polarity.

Figure 3:
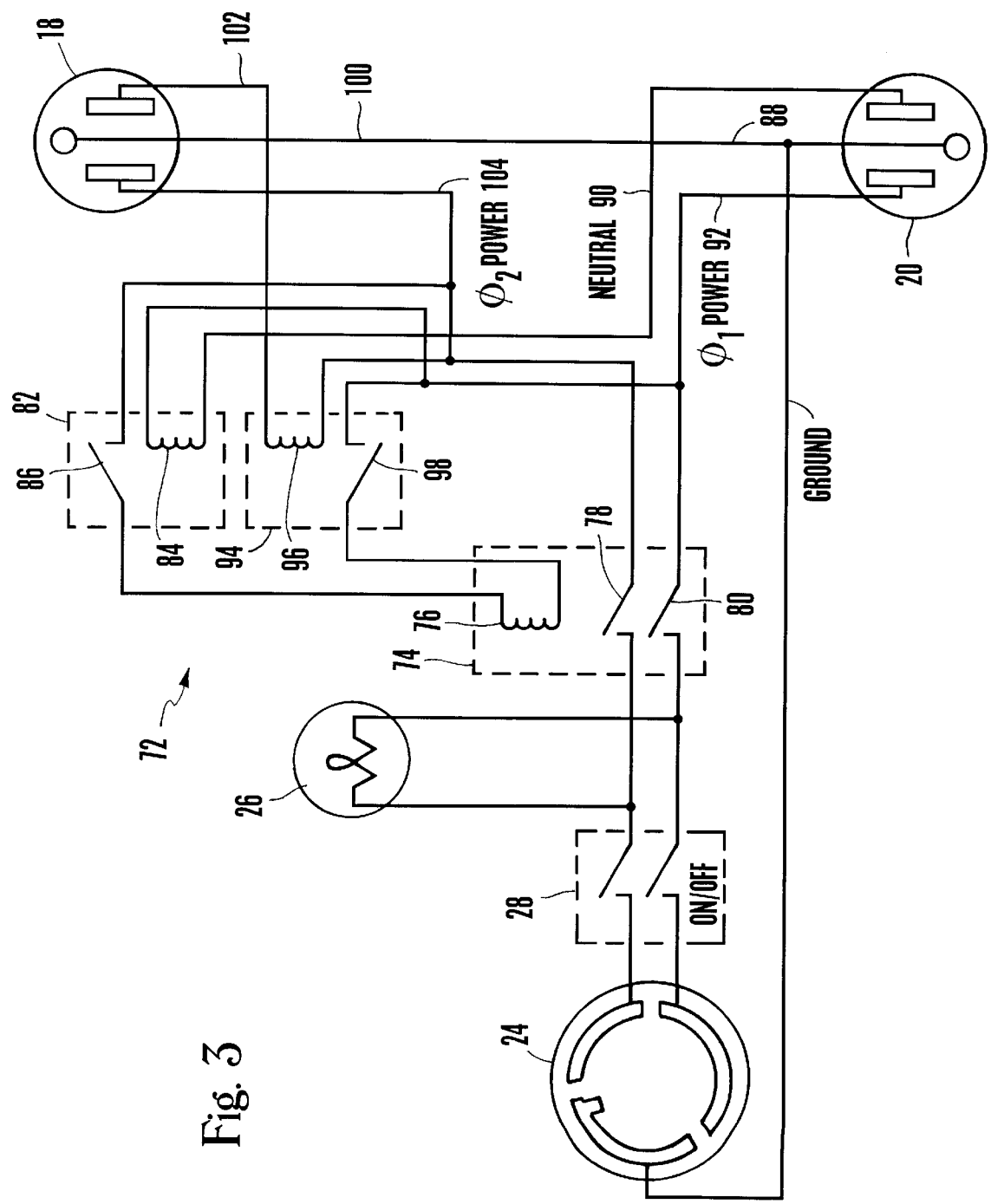
FIG. 3 is a schematic diagram of the control circuit of the adaptor shown in FIG. 1.

Now referring to FIG. 3, the present control circuit in the housing 12 is shown, generally designated 72. As shown, the control circuit 72 includes a main contactor 74 that in turn includes a main control coil 76. The main control coil 76 is energizable by 208V–220V to close first and second main contacts 78, 80 to energize the outlet receptacle 24 with electricity. Thus, the male connectors 18, 20 must both be connected to power sources with different phases to provide the main control coil 76 with sufficient voltage (208 volts) to enable it to close the main contactor 74.

In accordance with the present invention, the first main contact 78 in a circuit path from the first male electrical connector 18 to the outlet receptacle 24. Similarly, the second main contact 80 in a circuit path from the second male electrical connector 20 to the outlet receptacle 24.

Furthermore, the control circuit 72 includes a first control contactor 82 that in turn includes a first control coil 84. The first control coil 84 is energizable to close a first control contact 86 that is in a circuit path between the main control coil 76 and the first male electrical connector 18. The first control coil 84, however, can be energized only when the second male electrical connector 20 is connected to an energized power source connector. More specifically, the second male electrical connector 20 includes a ground lead 88, a second neutral lead 90, and a second power lead 92 (designated $\phi_1$, to indicate power having a first phase). As shown in FIG. 3, the second neutral lead 90 and second power lead 92 are connected to the first control coil 84 to energize the first control coil 84. The first control coil 84 cannot, on the other hand, be energized from the first male connector 18.

Likewise, the control circuit 72 includes a second control contactor 94 that in turn includes a second control coil 96. The second control coil 96 is energizable to close a second control contact 98 that is in a circuit path between the main control coil 76 and the second male electrical connector 20. The second control coil 96, however, can be energized only when the first male electrical connector 18 is connected to an energized power source connector. More specifically, the first male electrical connector 18 includes a ground lead 100, a first neutral lead 102, and a first power lead 104 (designated $\phi_2$, to indicate power having a second phase). As shown in FIG. 3, the first neutral lead 102 and first power lead 104 are connected to the second control coil 96 to energize the second control coil 96. The second control coil 96 cannot, on the other hand, be energized from the second male connector 20.

Recall that the main contactor 74 is energized by 208V–220V. Because the main contactor 74 can be closed only by voltage that is higher than the input voltage, i.e., the main contactor 74 can be closed only by applying a voltage of 208–220 volts to the main control coil 76, closing of the main contactor 74 is prevented when only one male electrical connector 18, 20 is energized or when the input power phases are identical to each other. Thus, to close the main contactor 74, both control contacts 86, 98 must be closed.

As mentioned above and shown in FIG. 3, when the main contactor 74 is closed by 208–220 volts across the main control coil 76, indicating the availability of 208V–220V power, the indicator lamp 26 is illuminated. Further, power is available at the outlet receptacle 24 only when the manual switch is in an "ON" position; otherwise, when the switch is in an "OFF" position, the output receptacle 24 is deenergized even if both male connectors 18, 20 are energized.

It may now be appreciated that owing to the above-disclosed control circuit 72, when one male electrical connector 18, 20 is connected to an energized extension cord and the other connector 20, 18 is exposed, the exposed male connector 20, 18 is deenergized. In other words, one male connector 18, 20 cannot energize the other male connector 20,18 through the outlet receptacle 24 when the other male connector 20, 18 is exposed, i.e., unplugged from an extension cord because no circuit path exists for such energization. From another aspect, when one male connector 18, 20 is energized and the other connector 20, 18 is exposed, no voltage differential from ground exists on the exposed male connector 20, 18 and, thus, energization of the exposed male connector 20, 18 before it is plugged into an extension cord is prevented.

Figure 2:
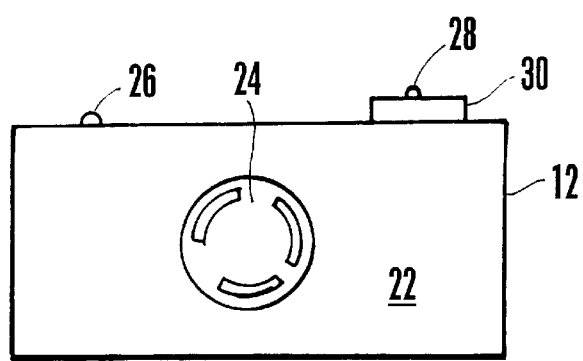
FIG. 2 is an elevational view of the outlet side of the voltage adaptor shown in FIG. 1.
Figure 4:
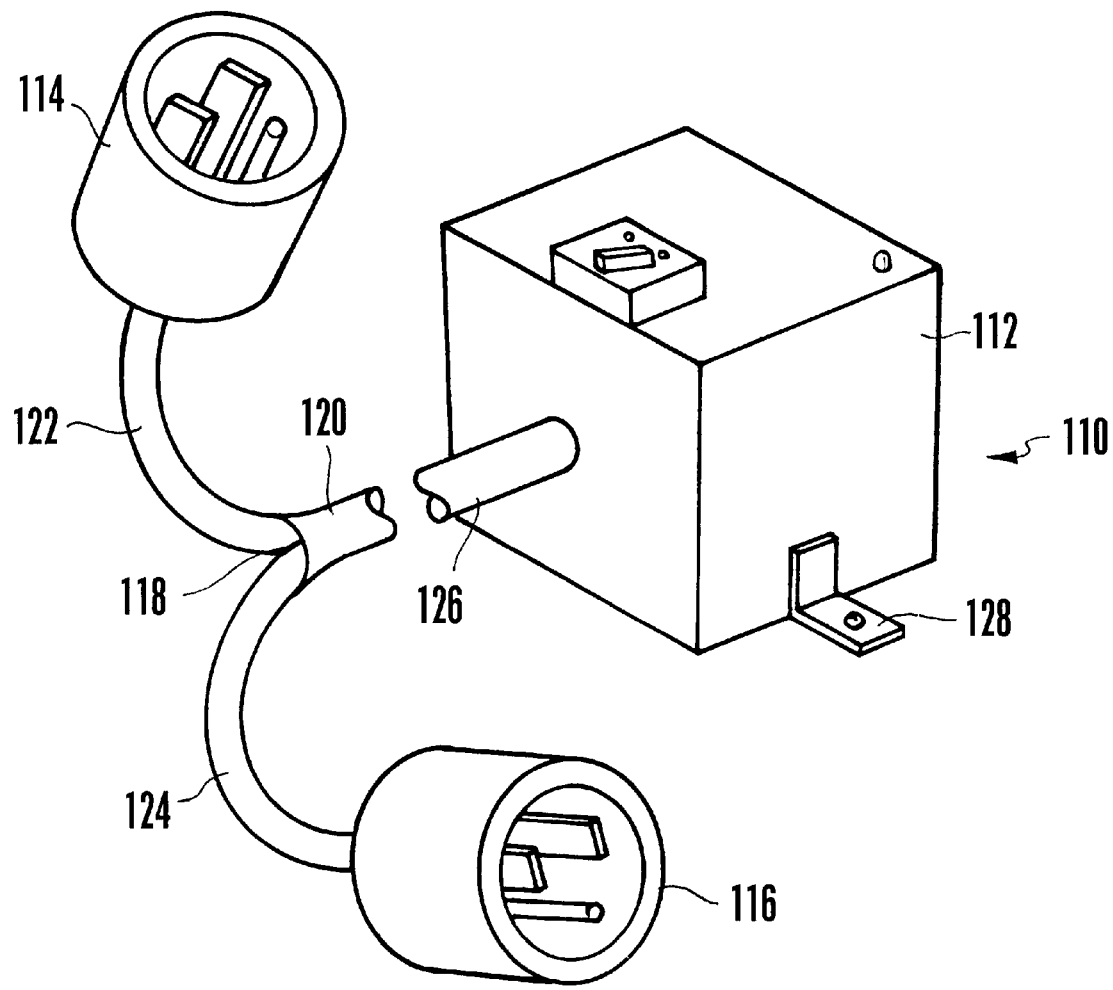
FIG. 4 is a perspective view of an alternate voltage adaptor including an adaptor cord with "Y" molding.
Figure 5:
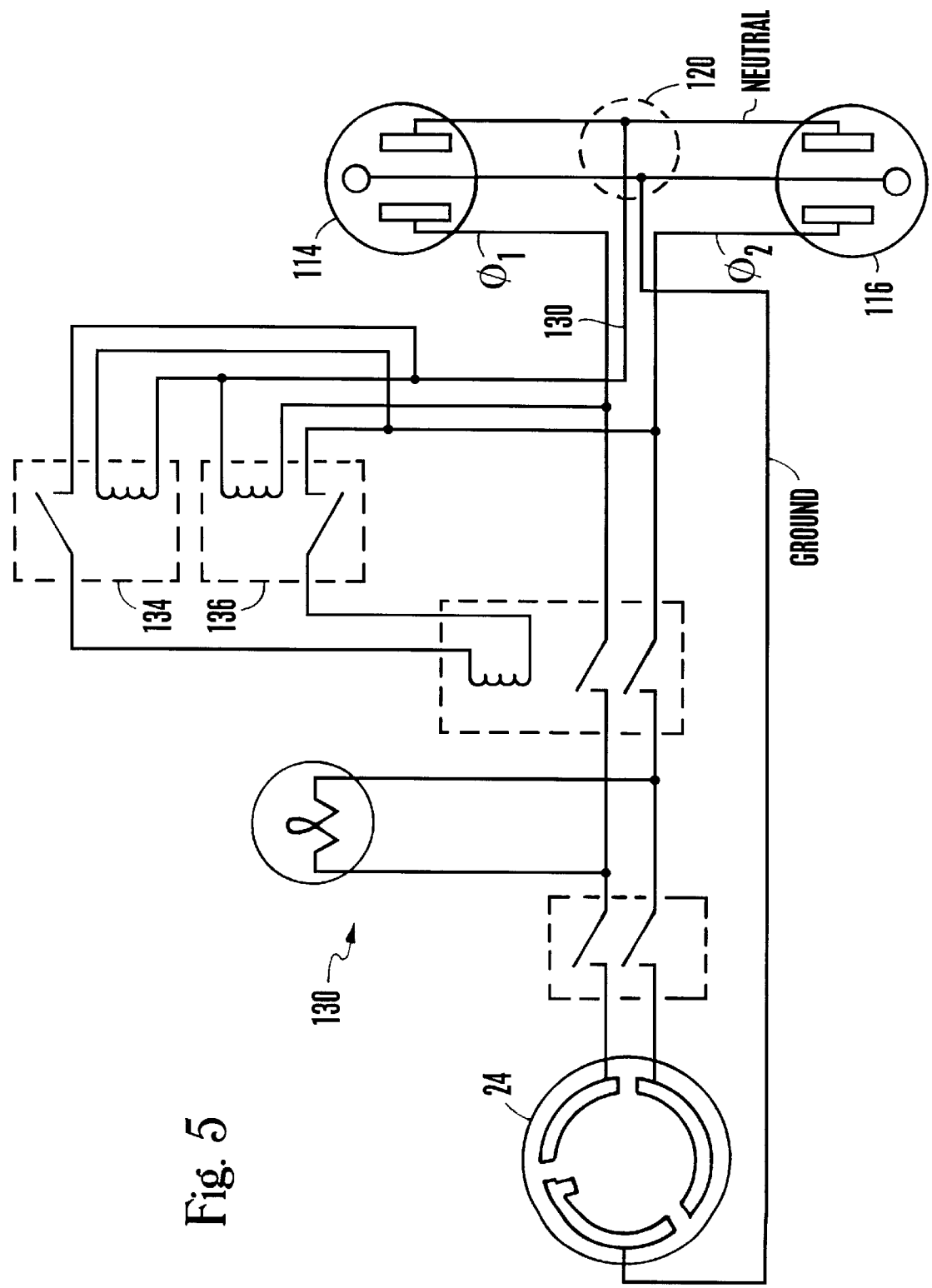
FIG. 5 is a schematic diagram of the control circuit of the adaptor shown in FIG. 3.

FIGS. 4 and 5 show an alternate voltage adaptor, generally designated 110, that is in all essential respects identical to the adaptor 10 shown in FIGS. 1–3, with the following exceptions. The adaptor 110 shown in FIGS. 4 and 5 includes a housing 112, and two shrouded male input connectors 114, 116 are distanced from the housing 112 and are electrically connected to a control circuit therein via an input cord 118. As shown in FIG. 4, the input cord 118 includes a rubber molded "Y" junction 120 that joins first and second connector leads 122, 124 with a single input lead 126 in accordance with "Y" junction principles known in the art. The input lead 126 is connected to the housing 112, whereas the first and second connector leads 122, 124 are respectively connected to the male connectors 114, 116.

FIG. 4 shows that one or more mounting brackets 126 can be attached to the housing 112 for mounting the housing 112 on a 220V device, e.g., a floor sander. It may now be appreciated that the single input lead 126 minimizes extension cord interference and fouling in the vicinity of the 220V device when the adaptor 110 is mounted thereon.

FIG. 5 shows a control circuit, generally designated 130, that is enclosed in the housing 112. The control circuit 130 shown in FIG. 5 is in all essential respects identical to the control circuit 72 shown in FIG. 3, with the following exceptions. A single neutral lead 132 emerges from the "Y" junction 120 as schematically shown, and this neutral lead 130 is electrically connected to both control contactors 134, 136 of the control circuit 130. Thus, the neutral lead 132 is common to both male connectors 114, 116 and both control contactors 134, 136. Nevertheless, an exposed male connector 114, 116 remains safe even when the other male connector 116, 114 is energized, because the voltage potential between neutral and ground on the exposed connector 116, 114 under these circumstances is zero.

While the particular 110 VOLT TO 220 VOLT ADAPTOR as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more".

What is claimed is:

1. A voltage adaptor for outputting electrical power having a voltage of at least 208–220 volts from two inputs each having voltages of 110 volts, comprising:
    a housing holding at least one control circuit including at least one outlet receptacle;
    a first male electrical connector electrically connected to the control circuit;
    a second male electrical connector electrically connected to the control circuit, wherein the control circuit includes:
        a main contactor including a main control coil energizable to close at least first and second main contacts to energize the outlet receptacle with electricity from the inputs, the first main contact being in a circuit path from the first male electrical connector to the outlet receptacle, the second main contact being in a circuit path from the second male electrical connector to the outlet receptacle;
        a first control contactor including a first control coil energizable to close a first control contact, the first control contact being in a circuit path between the main control coil and the first male electrical connector, the first control coil being energizable only when the second male electrical connector is connected to a first energized power source connector; and
        a second control contactor including a second control coil energizable to close a second control contact, the second control contact being in a circuit path between the main control coil and the second male electrical connector, the second control coil being energizable only when the first male electrical connector is connected to a second energized power source connector, the main control coil being energizable only when both control contacts are closed;
    whereby when the first male electrical connector is engaged with the second energized power source connector and the second male electrical connector is not engaged with the first power source connector, no voltage differential from ground exists on the second male electrical connector.

2. The voltage adaptor of claim 1, wherein each input has a respective power phase, and the main contactor can be energized only by applying a voltage of more than 208 volts to the main control coil, thereby preventing closing the main contactor when the power phases are identical to each other.

3. The voltage adaptor of claim 1, further comprising an indicator lamp on the housing, the indicator lamp being energized only when the main contactor is closed to indicate the availability of two hundred volt or more power.

4. The voltage adaptor of claim 1, further comprising a manual switch on the housing, the manual switch being operable to open and close power contacts in the circuit to the outlet receptacle.

5. The voltage adaptor of claim 1, wherein the housing is formed with first and second recesses for respectively holding the first and second male electrical connectors therein.

6. The voltage adaptor of claim 1, wherein the male electrical connectors are distanced from the housing and are connected thereto by an input cord, the input cord including a "Y" junction between the male electrical connectors and the housing.

7. The voltage adaptor of claim 1, wherein the first male electrical connector includes a ground lead, a first neutral lead, and a first power lead, the second male electrical connector includes a ground lead, a second neutral lead, and a second power lead, and the first neutral lead and first power lead are connected to the second control coil, the second neutral lead and second power lead being connected to the first control coil.

8. The voltage adaptor of claim 1, in combination with at least one pigtail, the pigtail including a neutral socket and a power socket, a neutral prong and a power prong, and a cord between the sockets and the prongs, the neutral prong being electrically connected to the power socket and the power prong being electrically connected to the neutral socket, whereby the pigtail can be connected to the voltage adaptor and to a power source having its polarity improperly reversed to thereby provide power and neutral outputs having proper polarity to the voltage adaptor.

9. The combination of claim 8, in further combination with a test device for engagement with an energized connector, the test device generating a signal representative of whether the connector has been energized with power having correct polarity.

10. A voltage adaptor for outputting, at an outlet, electrical power characterized by at least 208 volts, the adaptor comprising:
    first and second electrical input connectors for mating with respective first and second power connectors; and
    a control circuit interconnecting the input connectors to the outlet, the control circuit preventing energization of the outlet when the input connectors are mated with the respective first and second power connectors unless both first and second power connectors are energized, the control circuit further preventing energization of the first input connector when the first input connector is not mated with the first power connector and the second input connector is mated with the second power connector, wherein the control circuit includes:
        a first control coil connected to the first input connector, the first control coil being energized only when the second input connector is connected to the second power connector; and
        a second control coil connected to the second input connector, the second control coil being energized only when the first input connector is connected to the first power connector.

11. The adaptor of claim 10, wherein the outlet includes an outlet receptacle, the first and second input connectors are first and second male electrical connectors, and the control circuit includes:
- a main contactor including a main control coil energizable to close at least first and second main contacts to energize the outlet receptacle with electricity, the first main contact being in a circuit path from the first male electrical connector to the outlet receptacle, the second main contact being in a circuit path from the second male electrical connector to the outlet receptacle;
- a first control contactor including the first control coil, the first control coil being energizable to close a first control contact, the first control contact being in a circuit path between the main control coil and the first male electrical connector; and
- a second control contactor including the second control coil, the second control coil being energizable to close a second control contact, the second control contact being in a circuit path between the main control coil and the second male electrical connector, the main control coil being energizable only when both control contacts are closed.

12. The voltage adaptor of claim 11, wherein each male electrical connector is engageable with a respective input having a respective power phase, and the main contactor can be closed only by applying a voltage of more than 208 volts to the main control coil, to prevent closing the main contactor when the power phases are identical to each other.

13. The voltage adaptor of claim 11, further comprising a housing formed with first and second recesses for respectively holding the first and second male electrical connectors therein.

14. The voltage adaptor of claim 11, further comprising a housing for holding the control circuit, wherein the male electrical connectors are distanced from the housing and are connected thereto by an input cord, the input cord including a "Y" junction between the male electrical connectors and the housing.

15. The voltage adaptor of claim 11, wherein the first male electrical connector includes a ground lead, a first neutral lead, and a first power lead, the second male electrical connector includes a ground lead, a second neutral lead, and a second power lead, and the first neutral lead and first power lead are connected to the second control coil, the second neutral lead and second power lead being connected to the first control coil.

* * * * *